April 27, 1965   J. R. NEWCOMER, JR., ET AL   3,180,388
COINED RETAINING RING
Filed Nov. 13, 1961   2 Sheets-Sheet 2
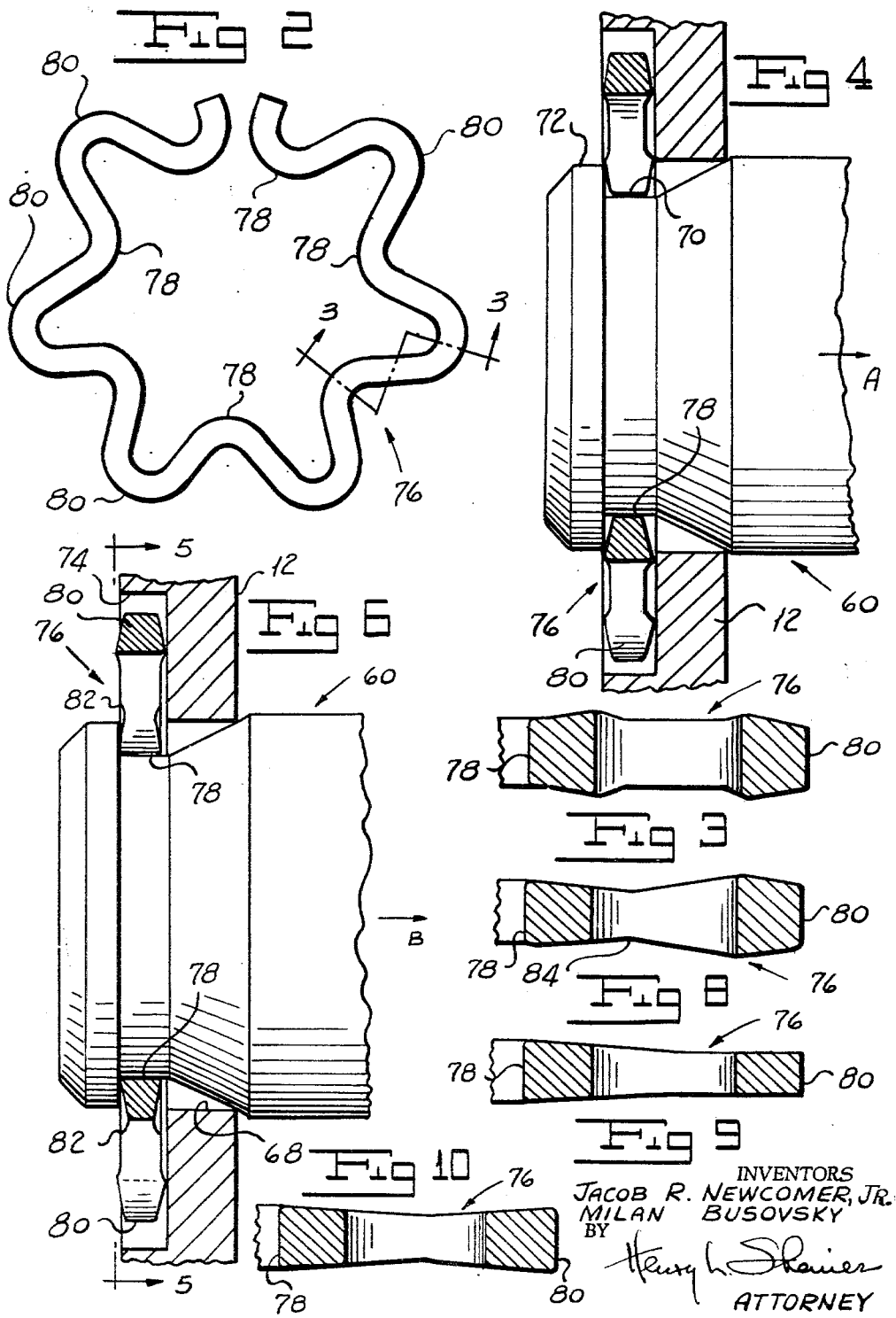
INVENTORS
JACOB R. NEWCOMER, JR.
MILAN BUSOVSKY
BY
Henry L. Shainer
ATTORNEY

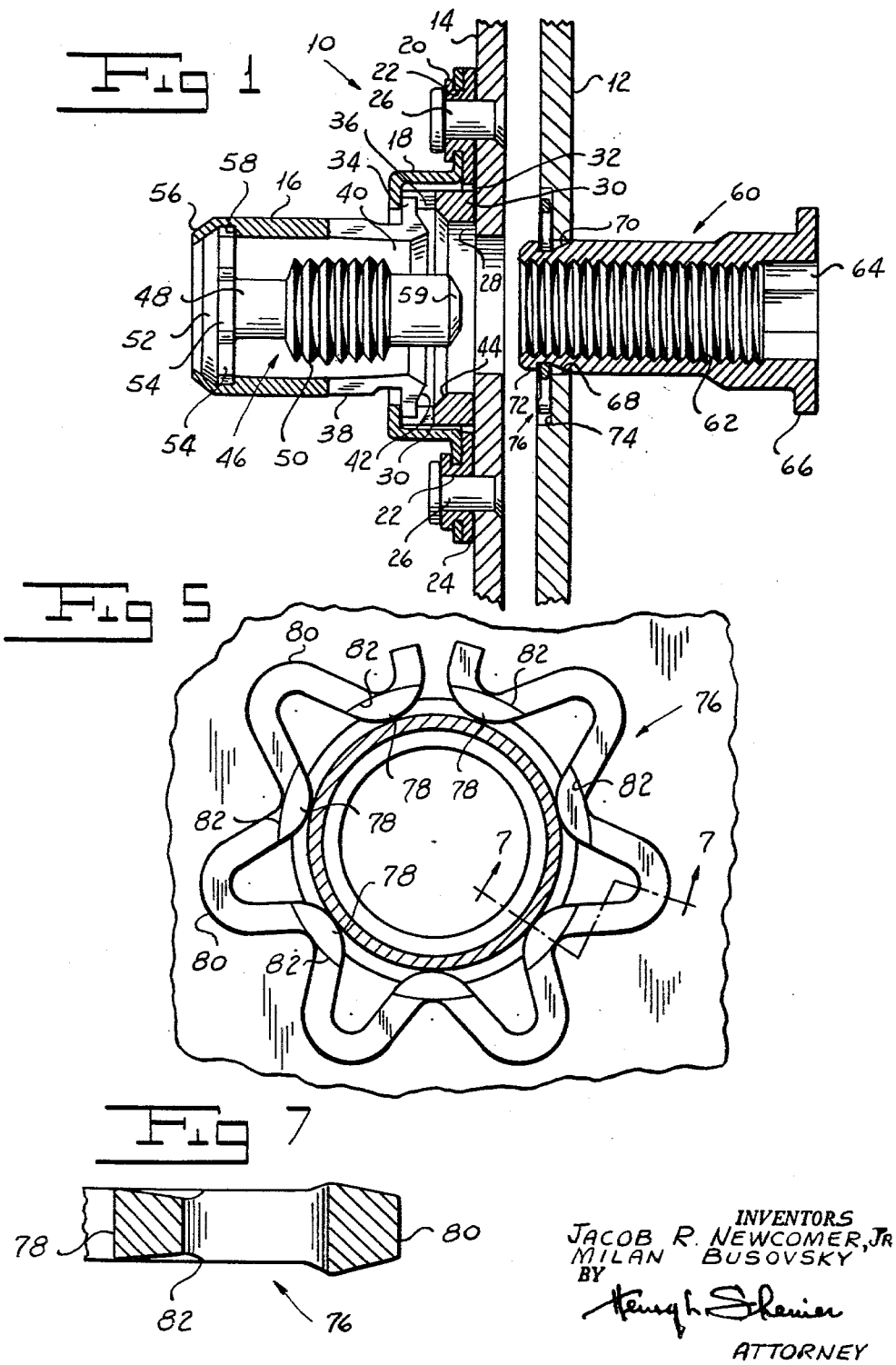

United States Patent Office 3,180,388
Patented Apr. 27, 1965

3,180,388
COINED RETAINING RING
Jacob R. Newcomer, Jr., Westwood, and Milan Busovsky, Paramus, N.J., assignors to Camloc Fastener Corporation, Paramus, N.J., a corporation of New York
Filed Nov. 13, 1961, Ser. No. 151,869
1 Claim. (Cl. 151—69)

Our invention relates to a coined retaining ring and more particularly to an improved retaining ring for holding the nut of a stressed panel fastener on the panel.

The copending application of John L. Vander Sande et al., Serial No. 116,314 filed June 12, 1961, discloses an interthreaded fastening assembly in which an internally threaded nut carried by a stressed panel coacts with an externally threaded stud carried by a frame member securely to hold the panel in position on the frame member while at the same time permitting its ready removal to give access to the space behind the panel. As is pointed out in the copending application, the arrangement of the fastener is such that the threaded nut is retained on the stressed panel when the nut is disengaged from the screw. A feature of construction of the assembly disclosed in the copending application is the provision of a mechanical fuse which relieves in response to excess tension or in response to excess torsion to prevent overtightening of the fastening element. The internally threaded nut of the fastener shown in the copending application is a resilient ring disposed in a recess in the stressed panel and adapted to expand around the internally threaded nut under the action of cam surfaces on the nut when the fastener is secured in its tightened position. When the nut is disengaged from the stud the spring retainer contracts around a reduced diameter portion of the nut and coacts with a flange or ledge on the end of the nut thus to retain the nut on the stressed panel.

One of the most efficient spring retainers which has heretofore been used is one which is bent from wire having a square cross-section to form a ring of generally serpentine configuration. Even this spring retainer fails to perform its function of retaining the nut on the panel when sufficient force is exerted on the ring between the retaining flange on the nut and the panel.

We have discovered that when a ring is formed in the manner described above, metal flows toward the inside of a convolution or bend of the ring so that in this area the ring has a "keystone" configuration. Owing to this fact, when a force is exerted between the nut and the panel the retaining flange on the nut acts on the "keystone" sections of the inboard convolutions of the ring in a direction to cam these convolutions outwardly to cause the spring to expand to free the nut from the panel. We have discovered that this is the cause of failure of fasteners of the type described above employing a retaining ring formed from wire having a square cross-section.

We have invented an improved retaining ring which overcomes the defects of rings of the prior art pointed out hereinabove. Our retaining ring holds the nut on the panel even under the action of a relatively large force exerted between the nut and the panel. The construction of our retaining ring is such that it not only overcomes the defects of retaining rings of the prior art but also it enhances the action of the ring in retaining the nut in position on the panel.

One object of our invention is to provide a retaining ring for a stressed panel fastener which overcomes the disadvantages of stressed panel fastener retaining rings of the prior art.

Another object of our invention is to provide a retaining ring for a stressed panel fastener which prevents the nut from being withdrawn from the panel accidentally even though considerable pull is exerted on the nut.

A further object of our invention is to provide a retaining ring for a stressed panel fastener which enhances the action of the retaining ring in securely locking the nut to the panel.

Still another object of our invention is to provide a method for making retaining rings for stressed panel fasteners.

Other and further objects of our invention will appear from the following description.

In general our invention contemplates the provision of a retaining ring for holding the nut of a stressed panel fastener on the panel in which the retainer is bent from resilient wire of square or rectangular cross-section to a serpentine configuration to form the ring. When the ring has thus been bent to shape, at least the inboard convolutions of the ring are coined to a keystone cross-sectional shape with the large dimension of the keystone adjacent the nut. Following the coining operation, the ring may be tempered.

In the accompanying drawings which form part of the instant specification and which are to be read in conjunction therewith and in which like reference numerals are used to indicate like parts in the various views:

FIGURE 1 is a sectional view of a stressed panel fastener including our improved retaining ring.

FIGURE 2 is a plan view of a stressed panel fastener retaining ring at an intermediate stage of the formation thereof.

FIGURE 3 is a sectional view of the stressed panel fastener retaining ring shown in FIGURE 2 drawn on an enlarged scale and taken along the line 3—3 of FIGURE 2.

FIGURE 4 is a fragmentary sectional view of the nut of a stressed panel fastener having a bent wire retaining ring and illustrating the ring action in an intermediate stage in the formation thereof.

FIGURE 5 is a sectional view of the stressed panel fastener shown in FIGURE 1 drawn on an enlarged scale and taken along the line 5—5 of FIGURE 6.

FIGURE 6 is a fragmentary sectional view of a stressed panel fastener nut together with our improved retaining ring illustrating the action of the ring in its completed form.

FIGURE 7 is a fragmentary sectional view of our retaining ring shown in FIGURE 5 drawn on an enlarged scale and taken along the line 7—7 of FIGURE 5.

FIGURE 8 is a fragmentary sectional view of an alternate form of our stressed panel fastener retaining ring.

FIGURE 9 is a fragmentary sectional view of yet another form of our stressed panel fastener retaining ring.

FIGURE 10 is a fragmentary sectional view of a still further form of our stressed panel fastener retaining ring.

Referring to FIGURE 1 of the drawings, we have illustrated a stressed panel fastener, indicated generally by the reference character 10, for securing a stressed panel 12 to a frame member 14. The fastener 10 includes a carrier 16. A carrier cage 18 surrounding the carrier 16 is retained on the frame member 14 by flanges 20 formed on rivet-receiving bushings 22 provided in a carrier retainer 24 secured to the member 14 by any suitable means such as by rivets 26 extending through the bushings 22. We disposed a clamping ring 28 between the frame 14 and the carrier 16. Lugs 30 disposed in notches 32 in an opening in the retainer 24 prevent relative rotation between the clamping ring 28 and the retainer 24. We form the inner end of the carrier 16 with ears 34 resting in slots 36 formed in the ring 28 to prevent relative rotation between the carrier and the ring. We provide the carrier 16 with a plurality of slots 38 extending from a point intermediate the length of the carrier to the end of the carrier adjacent member 14. Carrier 16 is formed from a resilient material such as steel so that the slots 38 form a plurality of spring tabs 40. An inclined surface 42 on the end of the carrier coacts with an inclined surface 44 formed on the ring 28 so that when the fastener is tightened in a manner to be described hereinafter the spring tabs 40 are cammed inwardly to hold the fastener in its tightened position.

Carrier 16 supports a stud, indicated generally by the reference character 46, provided with a threaded portion 50 and a necked portion 48. As is pointed out more fully in the copending application, owing to the reduced diameter of the neck portion 48 either a predetermined tension or a predetermined torsion permits the neck portion to rupture. The head 52 of the stud 46 has a plurality of wings 54 which lodge in corresponding slots formed in carrier 16. A flange 56 formed at the end of the carrier firmly holds the head 52 in engagement with a shoulder 58 formed in the inside of the carrier. In this manner we securely fasten the stud to the carrier to prevent any movement thereof either longitudinally of the carrier or around the longitudinal axis of the carrier. A tapered portion 59 on the end of the stud acts as a guide for the stud nut to be described hereinafter.

Panel 12 carries the internally threaded sleeve nut, indicated generally by the reference character 60, of the fastener 10. This nut 60 has internal threads 62 adapted to engage the threads 50 and it has a socket 64 by means of which it may be rotated by use of a suitable tool. A flange 66 surrounding the socket 64 is adapted to engage the portion of panel 12 around the nut-receiving opening 68 of the panel when the fastener is secured as will be described in detail hereinafter. A groove or recess 70 around the outside of the nut 60 remote from the socket 64 forms a flange or ledge 72 at the end of the nut. We provide the surface of the panel 12 facing the frame member 14 with an annular recess 74 for receiving the retaining ring, indicated generally by the reference character 76, which holds the nut 60 in position on the panel when the fastener is disengaged. As will be more fully pointed out hereinafter, the retainer 76 engages the flange 62 when the fastener is released to retain the nut 60 on the panel 12. When the fastener is tightened the retainer 76 is expanded outwardly around the nut 60.

As has been pointed out hereinabove, the most efficient retaining ring which has heretofore been used is one which is bent from wire having a square or rectangular cross-sectional shape. In making our retainer we bend a suitable resilient wire of square or rectangular cross-section to form a ring of serpentine configuration as illustrated in FIGURE 2 of the drawings. As can be seen by reference to this figure, the ring 76 thus formed includes a plurality of inwardly directed serpentine convolutions 78 and a plurality of outwardly directed serpentine convolutions 80. Referring to FIGURE 4, we have shown a ring thus formed in use to retain a nut 60 in position on a panel 12. In the position of the nut shown it has been disengaged from its associated stud and has been moved to a position at which retainer 76 has contracted into the annular groove or recess 70. It is to be noted that as is shown in FIGURE 2 the inwardly directed convolutions 78 have a "keystone" cross-sectional shape with the narrow dimension of the keystone adjacent the nut 60. Similarly, the outwardly directed convolutions 80 of the retainer 76 have their narrow dimensions outboard. With this arrangement, if a force is exerted on the nut 60 in the direction of the arrow A in FIGURE 4 tending to separate the nut from the panel then the ledge of flange 72 exerts a force on the underside of the convolutions 78 as viewed in FIGURE 4 to tend to cam these convolutions outwardly to expand the spring. If a sufficient force is exerted, the camming action will be great enough to move the convolutions 78 outboard of the flange 72 thus to free the nut 60 from the panel 12. Thus, while retaining rings formed from wire having a square or rectangular cross-section are the most efficient thus devised in the prior art, they are not as effective as is desirable.

We have discovered that by coining or otherwise reversing the keystone convolutions 78 the problem outlined above not only is eliminated but also the action of the retaining ring in holding the nut in position is enhanced.

Referring to FIGURE 5, we have shown one form of our retaining ring 76 in which the inwardly directed convolutions 78 have been coined to a point indicated by the lines 82 in the figure to reverse the direction of the keystone cross-section of these convolutions as shown in FIGURE 7. This operation can be performed in any suitable press known to the prior art with the use of appropriate dies. As is known in the art, this coining operation is a restricted cold flow process in which very high pressures are employed. While coining is the preferred manner in which we reverse the direction of the keystone cross-section of the convolutions 78, any suitable method of accomplishing this result can be employed.

Referring to FIGURE 6, we have shown the action of our retaining ring 76, the inboard convolutions 78 of which have cross-sections which are reversed from those of the preliminary form of ring 76 shown in FIGURES 2 and 3. It will be seen by reference to FIGURE 6 that in this form of our ring the narrow dimension of the cross-section faces outboard. In response to a force in the direction of the arrow B tending to remove the nut 60 from the panel 12, there is no camming action tending to expand the ring to permit the nut to move away from the panel. To the contrary, any force exerted on the retaining ring merely serves to hold it more firmly in position on the nut. In performing the coining operation, care must be exercised to avoid overcoining of the coined sections. Further, the intersecting radii adjacent the line 82 must be liberal to relieve stress risers.

The proportion of the coined area to the total area of the ring 76 and the actual configuration of the ring after coining may be varied to achieve the optimum desired result. That is, the proportion of the coined area to the total ring area may produce a difference in the expansion or contraction of the ring owing to coining. Referring to FIGURE 8, we have shown one alternate form of our coined retaining ring 76 in which the coined area extends over the inboard convolutions to a point indicated by the reference character 84. FIGURE 9 shows still another form of our coined retaining ring in which the entire ring is coined to reverse the keystone cross-section of the convolution 78 while causing the convolutions 80 to assume rectangular shape. If the ring is to be an internal retaining ring it may be desirable to coin the ring in the region of the outboard convolutions 80. In FIGURE 10 we have shown a form of our invention in which both the inner convolutions 78 and the outer convolutions 80 are coined so that their keystone cross-sections produced by the bending are reversed.

In operation of the fastener shown in FIGURE 1 of the drawings, when the stressed panel 12 is to be secured to the frame member 14, nut 60 is pushed through the opening in the frame member and over the stud 46. When this occurs the cam surface on the nut 60 leading into the recess 70 cams the inner convolutions 78 of the spring retainer 76 outwardly to expand the spring. As the nut is screwed onto the stud 50 the portion of the nut 60 of enlarged diameter leading to the head 66 further expands spring 76. As the nut is tightened, stud 46 is drawn toward the frame 14 so that cam surfaces 36 and 44 coact to cause the resilient tabs 38 to be forced inwardly firmly to hold the parts secured. If for any reason an excess of tension or torsion is exerted on the stud the frangible fuse portion 78 breaks to prevent damage to other parts of the assembly.

When the fastener is to be released, nut 60 is turned in the opposite direction to back it off the stud to a point at which the retainer 76 moves into the recess 70. When this occurs, the panel 12 is free of the frame member 14 and in response to an augmented axial force in the direction of the arrow B in FIGURE 6 the flange 72 and the portion of the panel 12 around the opening 68 exerts such a force on the convolutions 78 as to cam them into more secure engagement with the nut 60. The alternate forms of our retainer ring shown in FIGURES 8 to 10 may be employed if desired as substitutes for the form of the ring 76 shown in FIGURES 5 and 6 for the particular purposes set forth hereinabove.

It will be seen that we have accomplished the objects of our invention. We have provided a retaining ring for a stressed panel fastener which overcomes the defects of retaining rings of the prior art. Our retaining ring not only overcomes the defects of retaining rings of the prior art but also it holds the nut in position on the stressed panel more securely than do rings of the prior art. We have provided a method of making a stressed panel retaining ring which is an improvement over rings of the prior art.

It will be understood that certain features and subcombinations are of utility and may be employed without reference to other features and subcombinations. This is contemplated by and is within the scope of our claim. It is further obvious that various changes may be made in details within the scope of our claims without departing from the spirit of our invention. It is, therefore, to be understood that our invention is not to be limited to the specific details shown and described.

Having thus described our invention, what we claim is:

In a fastener for securing a member having a fastener receiving opening with a certain lateral dimension to a support, a fastener element having a longitudinal axis and provided with a shoulder extending substantially at right angles to said fastener element axis, said fastener element extending through said opening and having means to engage another fastener element, and a resilient retainer disposed between said shoulder and said member for holding said element on said member, said retainer having a ring-like shape provided with a plurality of inwardly extending serpentine convolutions engaging said shoulder, said retainer having an outer dimension substantially greater than the lateral dimension of said opening, said retainer having a generally trapezoidal cross-section in the area of said inwardly extending convolutions with the generally parallel sides of said cross-section extending substantially parallel to the longitudinal axis of the fastener element, the smaller dimensioned generally parallel side of said generally trapezoidal cross-section being remote from said element and forming an obtuse angle with the adjacent side of said cross-section which engages the shoulder of said element.

References Cited by the Examiner

UNITED STATES PATENTS

| 345,767 | 7/86 | Buckley | 85—8.8 |
| 527,856 | 10/94 | Hookham | 29—173 |
| 1,649,525 | 11/27 | Herold | 85—8.8 |
| 1,668,297 | 5/28 | Wuerfel | 29—173 |
| 1,758,515 | 5/30 | Heiermann | 85—8.8 |
| 2,157,516 | 5/39 | Young | 85—8.8 |
| 2,922,456 | 1/60 | Kann | 151—69 |
| 2,972,367 | 2/61 | Wootton | 151—69 |
| 2,991,816 | 7/61 | Harbison | 151—69 |

FOREIGN PATENTS

| 894,783 | 3/44 | France. |
| 1,245,002 | 9/60 | France. |
| 339,455 | 12/30 | Great Britain. |

EDWARD C. ALLEN, *Primary Examiner.*

CARL TOMLIN, *Examiner.*